(12) United States Patent
Moritani

(10) Patent No.: US 8,833,798 B2
(45) Date of Patent: Sep. 16, 2014

(54) AIRBAG DEVICE

(75) Inventor: Keisuke Moritani, Settsu (JP)

(73) Assignee: Ashimori Industry Co., Ltd., Osaka (JP)

( * ) Notice: Subject to any disclaimer, the term of this patent is extended or adjusted under 35 U.S.C. 154(b) by 0 days.

(21) Appl. No.: 13/990,343

(22) PCT Filed: Oct. 20, 2011

(86) PCT No.: PCT/JP2011/074152
§ 371 (c)(1),
(2), (4) Date: Jun. 13, 2013

(87) PCT Pub. No.: WO2012/073612
PCT Pub. Date: Jun. 7, 2012

(65) Prior Publication Data
US 2013/0270803 A1    Oct. 17, 2013

(30) Foreign Application Priority Data
Nov. 30, 2010    (JP) .................................. 2010-267456

(51) Int. Cl.
*B60R 21/206* (2011.01)
*B60R 21/231* (2011.01)
*B60R 21/215* (2011.01)

(52) U.S. Cl.
CPC ............. *B60R 21/231* (2013.01); *B60R 21/206* (2013.01); *B60R 21/215* (2013.01); *B60R 2021/21525* (2013.01); *B60R 2021/21512* (2013.01); *B60R 2021/23169* (2013.01)
USPC ..................................... 280/730.2; 280/728.2

(58) Field of Classification Search
CPC ................. B60R 21/206; B60R 21/23; B60R 2021/231691
USPC .......................... 280/730.1, 732, 743.1, 728.2
See application file for complete search history.

(56) References Cited

U.S. PATENT DOCUMENTS

| | | | |
|---|---|---|---|
| 6,170,871 B1* | 1/2001 | Goestenkors et al. | 280/743.1 |
| 6,517,103 B1* | 2/2003 | Schneider | 280/730.1 |
| 6,874,811 B2* | 4/2005 | Enders et al. | 280/730.1 |
| 7,581,749 B2* | 9/2009 | Robins | 280/728.2 |
| 8,336,910 B1* | 12/2012 | Kalisz et al. | 280/730.1 |
| 8,376,392 B2* | 2/2013 | Staebler et al. | 280/728.2 |
| 8,414,024 B1* | 4/2013 | Kalisz et al. | 280/753 |
| 2008/0106080 A1* | 5/2008 | Fukawatase et al. | 280/730.1 |
| 2011/0012329 A1 | 1/2011 | Sekino et al. | |
| 2011/0115201 A1* | 5/2011 | Best et al. | 280/728.2 |
| 2011/0272926 A1* | 11/2011 | Roychoudhury et al. | 280/728.2 |
| 2012/0112439 A1* | 5/2012 | Roychoudhury | 280/728.3 |

FOREIGN PATENT DOCUMENTS

| | | | |
|---|---|---|---|
| JP | 11-139233 A | 5/1999 | |
| JP | 2004-026039 A | 1/2004 | |
| JP | 4165372 B2 | 10/2008 | |
| JP | 2010-042803 A | 2/2010 | |
| WO | WO 2009124394 A1 * | 10/2009 | |

* cited by examiner

*Primary Examiner* — James English
(74) *Attorney, Agent, or Firm* — Sughrue Mion, PLLC

(57) ABSTRACT

An airbag is inflated and deployed in a short time, and a protective panel is moved rapidly. An airbag device (1) is disposed in a base section (2) of a vehicle. The airbag device (1) is provided with a protective panel (10) covering the base section (2), an airbag (20), and an inflator. The inflator inflates and deploys the airbag (20) by generating a gas. The airbag (20) has at least two standing portions (30) and inflates and deploys between the base section (2) and the protective panel (10). The standing portion (30) stands up from the base section (2) through inflation and moves the protective panel (10).

1 Claim, 4 Drawing Sheets

US 8,833,798 B2

AIRBAG DEVICE

CROSS REFERENCE TO RELATED APPLICATIONS

This application is a National Stage of International Application No. PCT/JP2011/074152 filed Oct. 20, 2011, claiming priority based on Japanese Patent Application No. 2010-267456 filed Nov. 30, 2010, the contents of all of which are incorporated herein by reference in their entirety.

TECHNICAL FIELD

The present invention relates to an airbag device to be mounted on a vehicle such as an automobile.

BACKGROUND ART

In order to protect occupants in a vehicle and pedestrians, various airbag devices have prevailed. For example, in order to protect an occupant seated on a seat in a vehicle, a knee airbag device is used. The knee airbag device is mounted on an instrument panel and disposed in front of the knee part of the occupant. In an emergency or a collision of the vehicle, the knee airbag device inflates and deploys an airbag and moves a protective panel for knees by the airbag to the knee part of the occupant. The knee part of the occupant is brought into contact with the protective panel, and movement of the knee part is prevented. As a result, the knee part is protected. As this knee airbag device, an airbag device provided with an inflatable bag main body and a surface member covering the bag main body is known (See Patent Document 1).

This prior-art airbag device inflates the bag main body between the instrument panel and the surface member. The surface member is moved by the bag main body, and the knee part of the occupant is protected by the surface member. However, with this airbag device, since the bag main body is brought into contact with the whole back surface of the surface member and deployed into a flat rectangular shape, a volume of the bag main body becomes large. As a result, time until the bag main body is fully inflated and deployed tends to become long. Along with this tendency, a moving speed of the surface member also becomes slow, and thus moving time of the surface member might become long. The moving time of the surface member is time until the surface member moves to a position where the surface member protects the knee part of the occupant (position the closest to the knee part). Therefore, from the viewpoint of protecting the knee part of the occupant early and reliably, improvement is required.

CITATION LIST

Patent Literature

PTL 1: Japanese Patent No. 4165372

SUMMARY OF INVENTION

Technical Problem

The present invention has been made in view of the above-described prior-art problems and an object is to reduce the capacity of an airbag provided in an airbag device so as to inflate and deploy the airbag in a short time. Another object is to rapidly move a protective panel by the airbag.

Solution to Problem

The present invention is an airbag device disposed on a base section of a vehicle, the airbag device including a protective panel covering the base section; an airbag which inflates and deploys between the base section and the protective panel, to move the protective panel; and an inflator which inflates and deploys the airbag by generating a gas. The airbag has at least two standing sections which stand up from the base section through inflation and move the protective panel.

Advantageous Effect of Invention

According to the present invention, the capacity of the airbag provided in the airbag device can be made small, and the airbag can be inflated and deployed in a short time. Moreover, the protective panel can be rapidly moved.

DESCRIPTION OF EMBODIMENTS

An embodiment of an airbag device of the present invention will be described below by referring to the attached drawings.

In this embodiment, a knee airbag device is used as an example for explanation. The knee airbag device is an airbag device for protecting knees. The knee airbag device is mounted in a vehicle and protects an occupant seated on a seat (a driver's seat or a front occupant's seat). Moreover, the knee airbag device is disposed in front of the knee part of an occupant. The knee airbag device suppresses movement of the knee part of the occupant and protects mainly the knee part of the occupant. In the following, the knee airbag device disposed in an instrument panel in front of the driver's seat will be explained.

Figure 1:
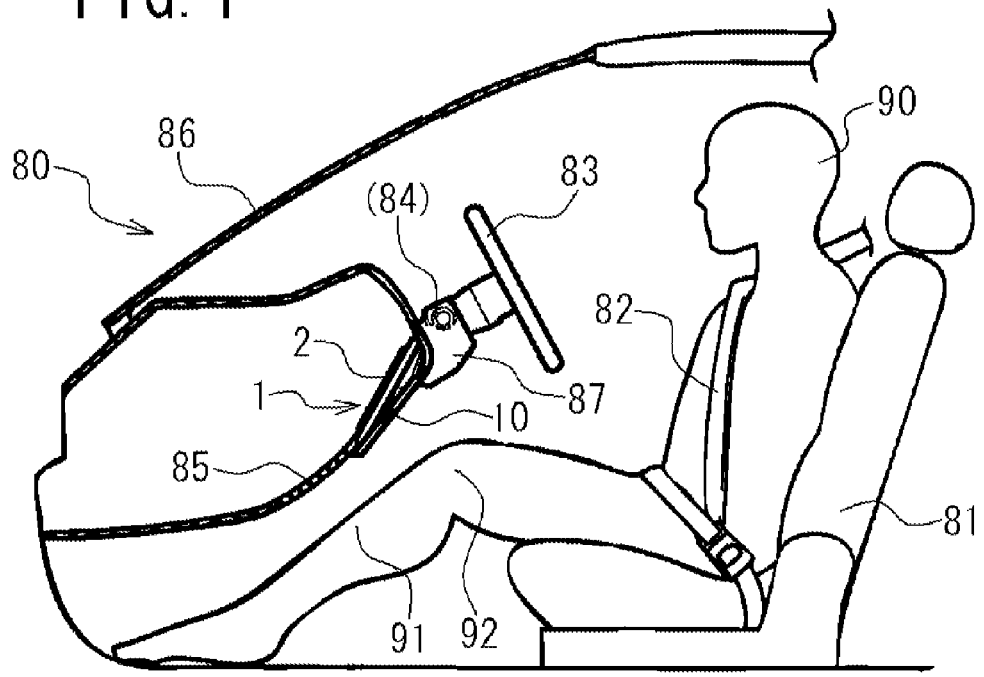
FIG. 1 is a cross-sectional diagram of a vehicle on which a knee airbag device of an embodiment of the present invention is mounted.
Figure 2:
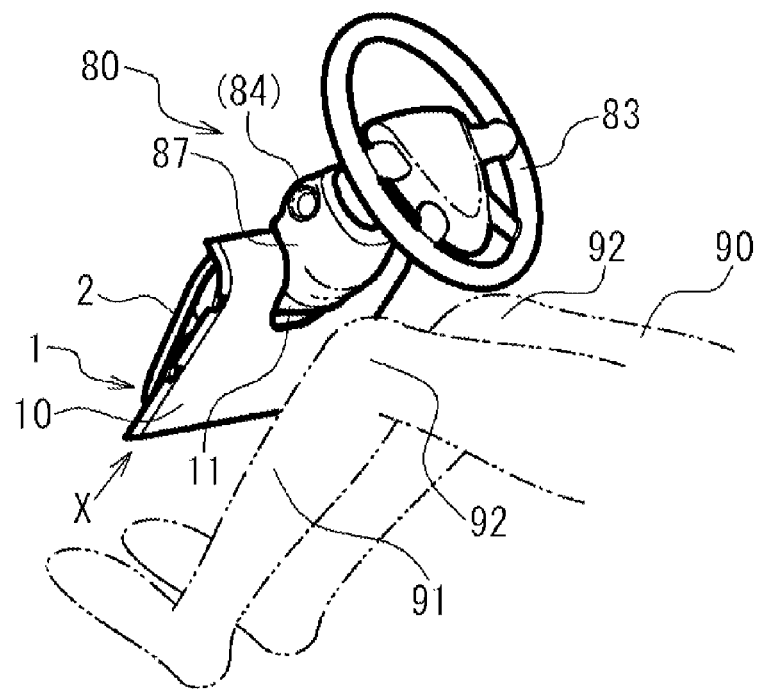
FIG. 2 is a perspective view of the knee airbag device mounted on the vehicle.

FIG. 1 is a cross-sectional diagram of a vehicle on which the knee airbag device of this embodiment is mounted. In FIG. 1, the vicinity of the driver's seat of the vehicle is illustrated when viewed from the side. In FIG. 1, a part of the vehicle 80 and the occupant 90 are illustrated in a side view. FIG. 2 is a perspective view of the knee airbag device 1 mounted on the vehicle 80. In FIG. 2, parts of the vehicle 80 and the occupant 90 are also illustrated.

The vehicle 80 is a general automobile. As shown in the figure, the vehicle 80 is provided with a driver's seat 81 and a seatbelt 82 which restrains the occupant 90 to the driver's seat 81. The vehicle 80 is provided with, in front of the occupant 90 (left in FIG. 1), a steering wheel 83, a steering shaft 84 to which the steering wheel 83 is fixed, and an instrument panel 85. The instrument panel 85 is provided below a front windshield 86. The instrument panel 85 is located above the shank part 91 and in front of the knee part 92 (referred to as knee-part front) of the occupant 90.

The knee airbag device 1 is disposed in the instrument panel 85 on the knee-part front of the occupant 90. The knee airbag device 1 is mounted below the steering wheel 83 in the vehicle 80. The knee airbag device 1 is disposed on a base section 2 of the vehicle 80 so as to face the right and left knee part 92. The base section 2 is provided on the knee-part front in the vehicle 80. The base section 2 is a member or a portion serving as a base of the knee airbag device 1 and is provided at a predetermined position of the instrument panel 85. The base section 2 is made up of a plate on which the knee airbag device 1 is attached or a casing which contains a part of the knee airbag device 1, for example. As described above, the base section 2 is constituted by a member fixed to the instrument panel 85. However, the base section 2 may be a predetermined portion of the instrument panel 85. In this case, the knee airbag device 1 is directly attached to the instrument panel 85.

The knee airbag device 1 is provided with a knee protective panel 10 that is a protection panel for knees covering the base section 2. The knee protective panel 10 is a member for protecting the knee part 92 of the occupant 90. The knee protective panel 10 prevents movement of the knee part 92 by coming in contact with the knee part 92. The knee protective panel 10 is formed into a plate shape by using a synthetic resin and the like and is disposed in the knee-part front so as to face the knee part 92. Moreover, the knee protective panel 10 is separably connected by connecting means (a connecting member, an adhesive and the like) to the base section 2 or the instrument panel 85. The knee protective panel 10 is connected to the base section 2 or the instrument panel 85 by the connecting means until the knee airbag device 1 is operated. The connecting means prevents removal of the knee protective panel 10. When the knee airbag device 1 is operated, the knee protective panel 10 is disconnected from the base section 2 or the instrument panel 85. The knee protective panel 10 moves from the base section 2 toward the knee part 92.

Here, the knee protective panel 10 is made up of a lower panel provided in the vehicle 80. The knee protective panel 10 is connected to the instrument panel 85 and constitutes a part of the surface of the instrument panel 85. Moreover, the knee protective panel 10 has a rectangular shape. A part of the knee protective panel 10 is formed into being curved in accordance with the surface shape of the instrument panel 85. The knee protective panel 10 has a void 11 in an upper part. In the void 11, a steering column 87 is disposed. The steering column 87 surrounds the steering shaft 84. Between the knee protective panel 10 and the base section 2, an airbag and an inflator are contained.

Figure 3A:
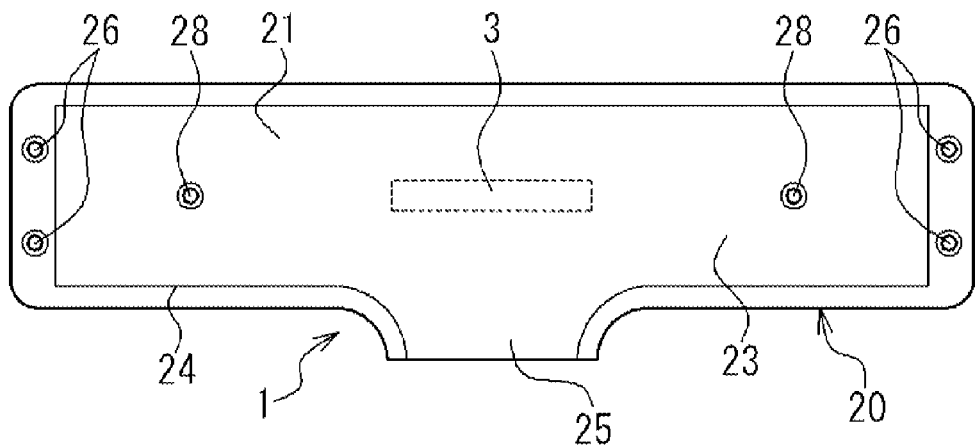
FIG. 3A is a plan view illustrating an airbag of this embodiment in a deployed manner.
Figure 3B:
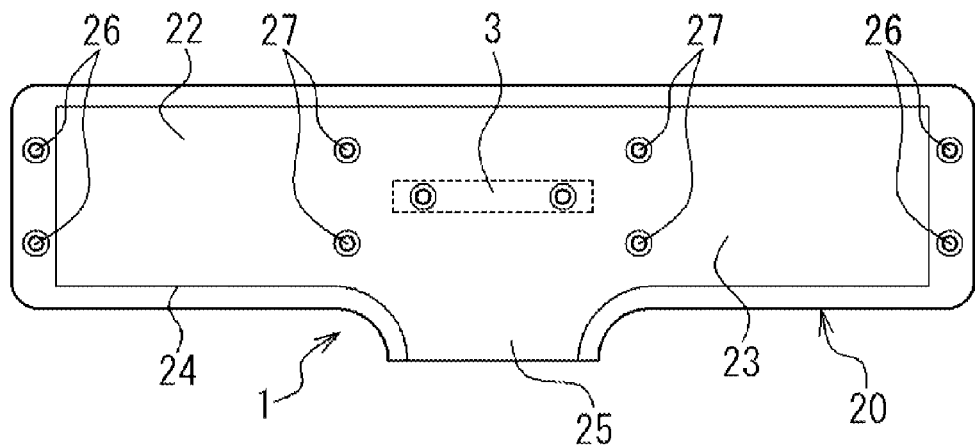
FIG. 3B is a plan view illustrating an airbag of this embodiment in a deployed manner.

FIGS. 3A and 3B are plan views illustrating the airbag of this embodiment in a deployed manner. In FIGS. 3A and 3B, a configuration in the airbag 20 is indicated by a dotted line. FIG. 3A is a diagram illustrating the airbag 20 when viewed from the knee protective panel 10 side (referred to as a front side). FIG. 3B is a diagram illustrating the airbag 20 when viewed from the base section 2 side (referred to as a back side).

The knee airbag device 1 is, as illustrated in the figure, provided with the airbag 20 capable of being inflated and deployed and an inflator 3 disposed in the airbag 20.

The inflator 3 is a cylinder-type gas generating device. The inflator 3 generates a gas in the airbag 20 in a vehicle emergency or at the time of detecting an impact. The airbag 20 is inflated and deployed by a gas supplied from the inflator 3 from a state folded into a predetermined shape. The inflator 3 is contained at the center part in the airbag 20 and disposed in a car width direction. The inflator 3 has a plurality of gas injection ports (not shown) on one end portion. The inflator 3 radially blows out the gas from the plurality of gas injection ports.

The airbag 20 is a bag body formed into a rectangular shape on plan view. The airbag 20 is disposed in the knee protective panel 10 in a state where the inflator 3 is contained inside. The airbag 20 is inflated and deployed by the gas generated by the inflator 3 on the back side of the knee protective panel 10. The airbag 20 has a front-side base cloth 21 disposed on the front side and a back-side base cloth 22 disposed on the back side. Each of the front-side base cloth 21 and the back-side base cloth 22 is made up of a rectangular cloth, and constitutes the front surface and the back surface of the airbag 20, respectively. The front-side base cloth 21 and the back-side base cloth 22 define an inflatable gas chamber 23 inside the airbag 20.

The airbag 20 is formed by joining a plurality of overlapped base cloths 21 and 22. The base cloths 21 and 22 are joined by sewing or adhesion (sewing is used here) at an outer edge joint portion 24. The outer edge joint portion 24 defines the inside and outside of the airbag 20 and defines an outer edge shape of the gas chamber 23. The base cloths 21 and 22 are sewn in a row or in a plurality of rows along the outer edge joint portion 24. Between the base cloths 21 and 22, the gas chamber 23 is formed. The airbag 20 has an opening portion 25. The opening portion 25 is formed in the airbag 20 by partially not joining the base clothes 21 and 22. The inflator 3 is inserted into the airbag 20 through the opening portion 25. After the inflator 3 is disposed at a predetermined position in the gas chamber 23, the portion of the opening portion 25 in the airbag 20 is sewn (or folded) for sealing the opening portion 25. In that state, the inflator 3 is fixed to the base section 2 by a fixing member. The airbag 20 is attached to the base section 2 and the knee protective panel 10.

Between the base section 2 and the knee protective panel 10, one side and the other side of the overlapped base cloths 21 and 22 of the airbag 20 are attached to the knee protective panel 10 and the base section 2, respectively. Therefore, the airbag 20 has attaching portions for the base section (referred to as base attaching portions) 26 and 27 and an attaching portion for the knee protective panel (referred to as a panel attaching portion) 28. The base attaching portions 26 and 27 are attached to the base section 2. The panel attaching portion 28 is attached to the knee protective panel 10. At each position of the attaching portions 26, 27, and 28, the airbag 20 is fixed to the base section 2 or the knee protective panel 10 by one or more fixing members (not shown). As a result, the airbag 20 is attached to the base section 2 or the knee protective panel 10. At that time, the base attaching portions 26 and 27 are attached to a surface (front surface) of the base section 2 facing the knee protective panel 10. The panel attaching portion 28 is attached to a surface (back surface) of the knee protective panel 10 facing the base section 2.

Here, the four base attaching portions 26 and 27 are provided at predetermined intervals in the longitudinal direction (right and left direction in FIGS. 3A and 3B) of the airbag 20. The base attaching portions 26 and 27 are fixed to the base section 2 at two spots, respectively. One of the base attaching portions 26 is located outside the gas chamber 23 on the both ends of the airbag 20. At the base attaching portions 26, the both base cloths 21 and 22 are attached to the base section 2. The other of the base attaching portions 27 is located on the both sides of the inflator 3 in the gas chamber 23. At the base attaching portion 27, only the back-side base cloth 22 is attached to the base section 2. In contrast to this, the panel attaching portion 28 is provided each (2 in total) between one and the other of the base attaching portions 26 and 27. Each of the panel attaching portions 28 is fixed to the knee protective panel 10 at one spot. The panel attaching portion 28 is located in the gas chamber 23. At the panel attaching portion 28, only the front-side base cloth 21 is attached to the knee protective panel 10. The airbag 20 is attached to the base section 2 and the knee protective panel 10 by each of the attaching portions 26, 27, and 28 and is disposed between the base section 2 and the knee protective panel 10.

Figure 4:
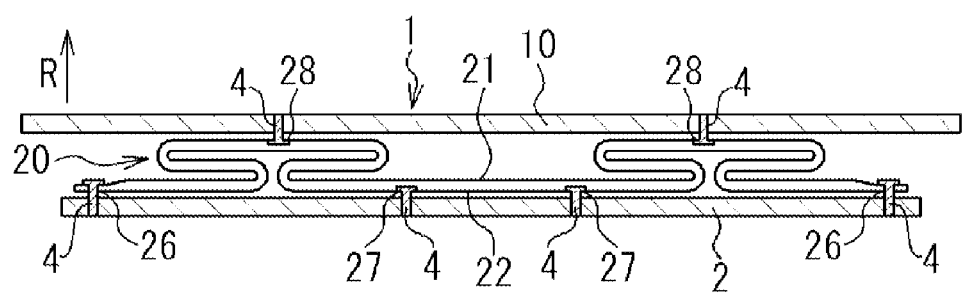
FIG. 4 is a cross-sectional diagram illustrating the airbag contained between a base section and a knee protective panel.

FIG. 4 is a cross-sectional diagram illustrating the airbag 20 contained between the base section 2 and the knee protective panel 10. In FIG. 4, the airbag 20 before inflation is schematically illustrated when viewed from an arrow X direction in FIG. 2.

The attaching portions 26, 27, and 28 of the airbag 20 are, as illustrated in the figure, attached to the surface of the plate-shaped base section 2 and the back surface of the knee protective panel 10, by fixing members 4. The fixing member 4 is formed of a screw, a rivet or the like, penetrating the base cloths 21 and 22. The airbag 20 is disposed in a folded state, in the car width direction (right and left direction in FIG. 4). The airbag 20 is held in a state of being sandwiched between the base section 2 and the knee protective panel 10. In this airbag 20, the peripheral portion of the panel attaching portion 28 is folded in the state where the base cloths 21 and 22 are overlapped. The airbag 20 inflates from the folded shape toward a predetermined shape. The airbag 20 inflates and deploys between the base section 2 and the knee protective panel 10. As a result, the airbag 20 moves the knee protective panel 10 from the base section 2 toward the knee part 92 of the occupant 90 (an arrow R in FIG. 4).

Figure 5:
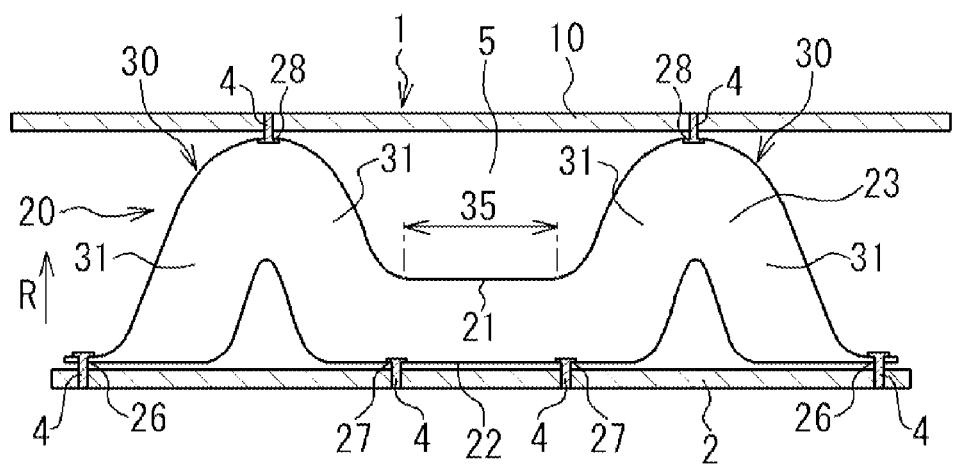
FIG. 5 is a cross-sectional view illustrating the airbag inflated and deployed.

FIG. 5 is a cross-sectional diagram illustrating the inflated and deployed airbag 20.

The airbag 20 is, as illustrated in the figure, inflated and deployed by filling a gas in the gas chamber 23. The knee protective panel 10 is pressed by the inflating airbag 20 and moves to a position where the knee part 92 of the occupant 90 is protected from the position covering the base section 2. At that time, since the positions of the attaching portions 26, 27, and 28 are fixed in place with respect to the base section 2 and the knee protective panel 10, the airbag 20 inflates so as to bend in the vicinity of the attaching portions 26, 27, and 28. Along with this inflation, the airbag 20 between the bent portions separates from the base section 2 and gradually stands between the base section 2 and the knee protective panel 10.

The airbag 20 in this embodiment has at least two (here, two) standing portions 30. The two standing portions 30 are cylindrical portions constituting a part of the airbag 20 and are formed integral with a predetermined portion (both end portions, here) of the airbag 20. The insides of the two standing portions 30 communicate with each other via a non-standing portion 35. The standing portion 30 inflates to standup from the base section 2 toward the knee protective panel 10, along with the inflation of the airbag 20. The standing portion 30 stands up from the base section 2 through inflation and protrudes toward the knee protective panel 10. The standing portion 30 moves the knee protective panel 10 from the base section 2 toward the knee part 92 of the occupant 90, along with the standing. As a result, the knee protective panel 10 separates from the base section 2 and is disposed at a position where the knee part 92 is protected. The airbag 20 contacts the knee protective panel 10 at the tip of the standing portion 30 when inflating and deploying. The portion between the standing portions 30 of the airbag 20 separates from the knee protective panel 10. Therefore, between the airbag 20 and the knee protective panel 10, a relatively large space 5 is formed.

Here, the standing portion 30 has the two each base attaching portions 26 and 27 and one panel attaching portion 28 disposed between the two base attaching portions 26 and 27. Since the standing portion 30 is attached to the base section 2 and the knee protective panel 10 by the attaching portions 26, 27, and 28, the standing portion 30 inflates in the shape of inverted V with the vicinities of the attaching portions 26, 27, and 28 as apexes. The standing portion 30 bends around the panel attaching portion 28 and forms a pair of inclined portions 31. The pair of inclined portions 31 extend from the panel attaching portion 28 with inclination in directions opposite to each other and are attached to the base section 2 and the knee protective panel 10, respectively. The pair of inclined portions 31 maintain the standing portion 30 in the standing state by supporting each other.

Note that, in a state where the airbag 20 is folded (See FIG. 4), the overlapped both base cloths 21 and 22 are disposed so as to be orthogonal to a standing direction R of the standing portion 30. As a result of inflation of the gas chamber 23, the base cloths 21 and 22 separate from each other, and the airbag 20 inflates and deploys in the thickness direction. Moreover, in a state where the attaching portions 26, 27, and 28 are attached to the base section 2 or the knee protective panel 10, the two standing portions 30 of the airbag 20 stand up. As a result, the airbag 20 moves the knee protective panel 10 only by a predetermined distance. At that time, the two standing portions 30 stand up at the same timing and move the whole knee protective panel 10 equally. The knee protective panel 10 moves without bias as a result of inflation of the airbag 20 and standing of the standing portion 30. As a result, fluctuation in attitude of the knee protective panel 10 is suppressed.

After the knee airbag device 1 is mounted on the vehicle 80, the knee airbag device 1 operates the inflator 3 in an emergency or the like of the vehicle 80. The inflator 3 generates a gas and supplies the gas into the gas chamber 23 of the airbag 20 (See FIG. 5). By means of this gas, the airbag 20 is inflated while the folded shape is dissolved. The airbag 20 is inflated and deployed between the base section 2 and the knee protective panel 10. By the fact that the airbag 20 is first inflated entirely, the thickness of the airbag 20 is increased. The knee protective panel 10 separates from the instrument panel 85 by the force of inflation of the airbag 20. Moreover, movement of the knee protective panel 10 starts. Subsequently, along with standing up of the standing portion 30, the knee protective panel 10 is pushed by the standing portion 30. The knee protective panel 10 moves toward the knee part 92 of the occupant 90.

The knee airbag device 1 moves the knee protective panel 10 and arranges it at a predetermined position in the knee-part front by the standing portion 30 of the airbag 20. The knee part 92 of the occupant 90 is brought into contact with the knee protective panel 10 and is restrained by the knee airbag device 1. At that time, the knee airbag device 1 receives the knee part 92 by the knee protective panel 10 and prevents movement of the knee part 92. At the same time, by absorbing impact energy by the inflated and deployed airbag 20, an impact applied to the knee part 92 is alleviated. As a result, the knee airbag device 1 protects the knee part 92.

In the knee airbag device 1 described above, since the standing portion 30 is provided in the airbag 20, the capacity of the airbag 20 can be reduced. As a result, time required for the airbag 20 to fully inflate and deploy can be reduced, and thus the airbag 20 inflates to a set shape earlier. Furthermore, since the standing portion 30 quickly inflates and stands up, the moving speed of the knee protective panel 10 is also expedited. As a result, the knee protective panel 10 moves, in a short time, to the position where the knee part 92 of the occupant 90 is protected, and is brought into contact with the knee part 92 earlier. Moreover, the knee protective panel 10 can be stably supported by at least two standing portions 30. By receiving the knee part 92 by the knee protective panel 10, the lower limb of the occupant 90 can be protected.

Therefore, according to the knee airbag device 1 of this embodiment, the capacity of the airbag 20 can be reduced, and the airbag 20 can be inflated and deployed in a short time. Moreover, the knee protective panel 10 can be rapidly moved by the airbag 20 toward the knee part 92 of the occupant 90 so as to protect the knee part 92 early and reliably. At the same time, since the forward movement of waist part of the occupant 90 can be regulated, the effect of the seat belt 82 of restraining the occupant 90 can be also improved. Even if the knee protective panel 10 is cracked, the knee part 92 is received by the airbag 20, and the impact energy can be absorbed, and thus the knee part 92 can be protected.

By joining the overlapped base cloths 21 and 22, the airbag 20 can be easily formed. As a result, a labor and a cost of manufacturing the airbag 20 can be reduced. Since the airbag 20 formed of the base cloths 21 and 22 can be folded in a compact manner, a containing space for the airbag 20 can be also reduced. Moreover, when the back-side base cloth 22 on one side of the overlapped cloths is attached to the base section 2 and the front-side base cloth 21 on the other side of the overlapped cloths is attached to the knee protective panel 10, the flat surfaces of the base cloths 21 and 22 are attached to the base section 2 and the knee protective panel 10. Therefore, the base cloths 21 and 22 can be easily attached to the base section 2 and the knee protective panel 10. The attachment of the base cloths 21 and 22 is also facilitated. Moreover, since the airbag 20 is in contact with the base section 2 and the knee protective panel 10 in a wider area, the knee protective panel 10 can be supported more stably.

Since the base attaching portions 26 and 27 and the panel attaching portion 28 are provided on the standing portion 30 of the airbag 20, the standing portion 30 inflates without fluctuation in its shape or position between the base section 2 and the knee protective panel 10. The standing portion 30 stands to a set height. As a result, since the movement of the knee protective panel 10 is regulated, the knee protective panel 10 can be reliably moved to a predetermined position. By changing the height to which the standing portion 30 stands, the position to which the knee protective panel 10 is moved can be easily adjusted.

In the standing portion 30, it is preferable that two base attaching portions 26 and 27 and one panel attaching portion 28 disposed between the base attaching portions 26 and 27 are provided. By configuration as above, the standing portion 30 bends around the panel attaching portion 28 at the center. Moreover, as described above, the pair of inclined portions 31 of the standing portion 30 support each other by pressing each other. As a result, the standing portion 30 is made stable, and thus the knee protective panel 10 can be firmly supported by the standing portion 30. In addition, since the impact energy can be distributed and absorbed when the knee part 92 is brought into contact with the knee protective panel 10, impact-energy absorbing capacity can be improved. Since the force applied to the knee protective panel 10 is also distributed toward the two base attaching portions 26 and 27, the force applied to each of the base attaching portions 26 and 27 can be made small. Therefore, the airbag 20 does not have to be attached firmly to the base section 2 by the base attaching portions 26 and 27.

Note that, the standing portions 30 are provided as appropriate at a plurality of spots in the airbag 20 corresponding to each condition. The conditions include, for example, the shapes of the airbag 20 and the knee protective panel 10, the sizes of the airbag 20 and the knee protective panel 10, a movement mode of the knee protective panel 10 or a contact position of the knee part 92. Three or more standing portions 30 may be provided in the airbag 20. The airbag 20 may be formed into a shape other than a rectangle (an oval shape, a diamond shape and the like). The airbag 20 may be formed into a semispherical shape, a U-shape or a V-shape in accordance with the shape of the knee protective panel 10 (See FIG. 2).

Figure 6A:
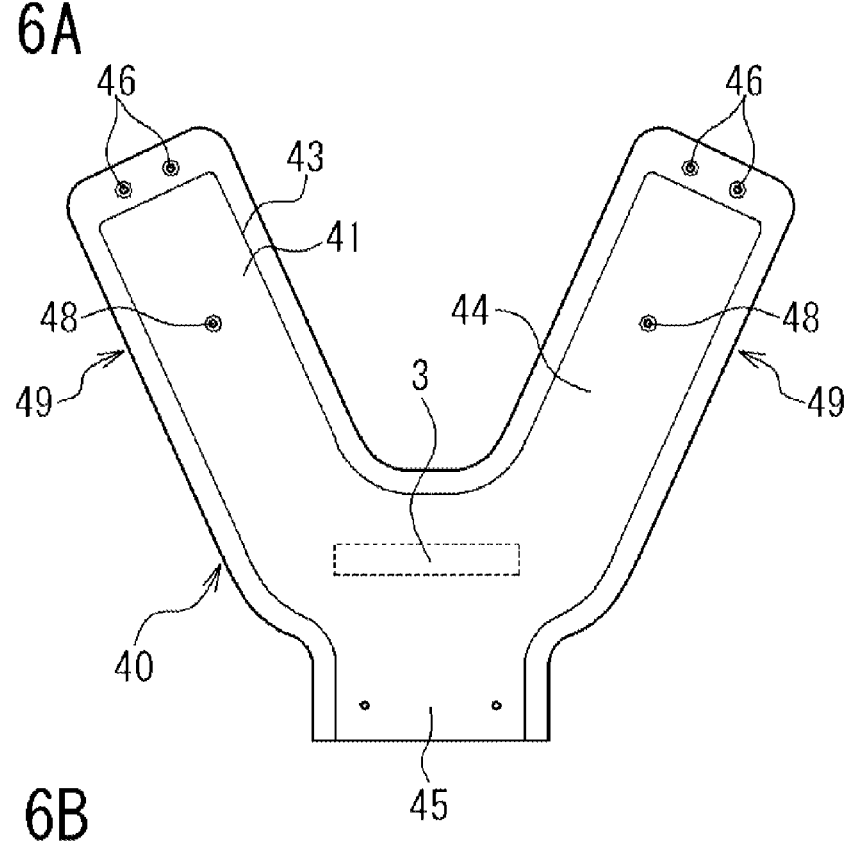
FIG. 6A is a plan view illustrating the airbag formed into the V-shape in a deployed manner.
Figure 6B:
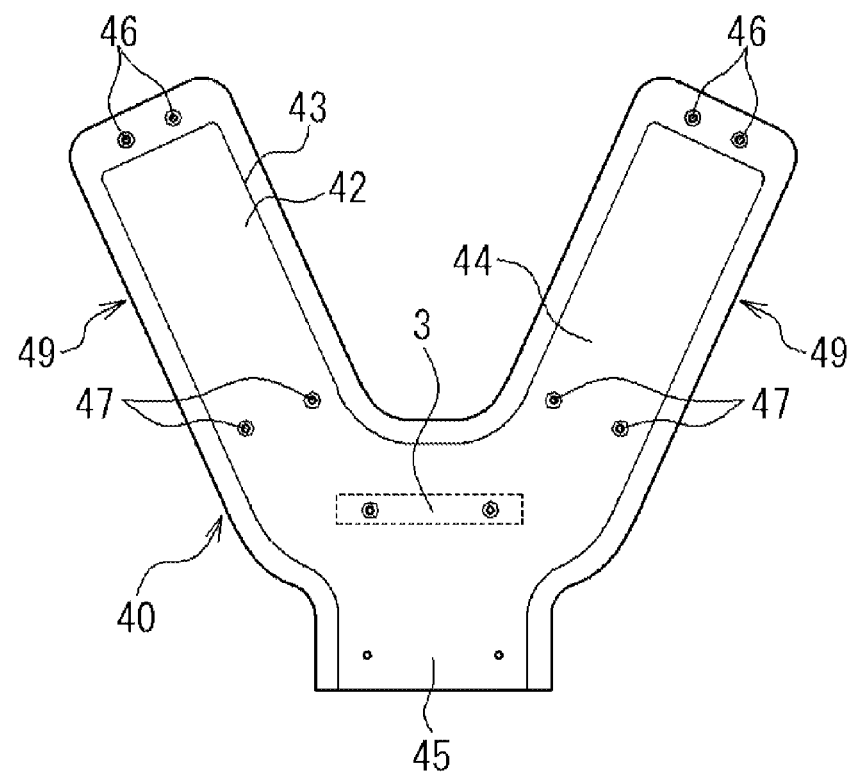
FIG. 6B is a plan view illustrating the airbag formed into the V-shape in a deployed manner.

FIGS. 6A and 6B are plan views illustrating an airbag 40 formed into the V-shape in a deployed manner. In FIGS. 6A and 6B, the configuration in the airbag 40 is indicated by a dotted line. FIG. 6A is a diagram illustrating the airbag 40 when viewed from the front side. FIG. 6B is a diagram illustrating the airbag 40 when viewed from the back side.

This airbag 40 is basically configured in the same way as the airbag 20 having been already explained. Therefore, in the following, the same configuration as that of the airbag 20 is given the same name and the detailed explanation will be omitted.

The airbag 40 has the V-shape on plan view as illustrated in the figure. The airbag 40 is disposed in the knee protective panel 10 in a state of containing the inflator 3 inside. The airbag 40 has a front-side base cloth 41 and a back-side base cloth 42. The front-side base cloth 41 and the back-side base cloth 42 are joined by an outer edge joint portion 43, and a gas chamber 44 is formed between the base cloths 41 and 42. The inflator 3 is inserted into the airbag 40 from an opening portion 45.

The airbag 40 has base attaching portions 46 and 47 and a panel attaching portion 48. The base attaching portions 46 and 47 are located at two tips of the airbag 40 and on the both sides of the inflator 3. The panel attaching portion 48 is located between the base attaching portions 46 and 47. Each of the attaching portions 46, 47, and 48 of the airbag 40 is attached to the base section 2 or the knee protective panel 10. The airbag 40 is disposed between the base section 2 and the knee protective panel 10. The airbag 40 inflates so as to bend at positions of the attaching portions 46, 47, and 48. Through the inflation, a portion between the base attaching portions 46 and 47 of the airbag 40 (standing portion 49) stands up. The standing portion 49 has two base attaching portions 46 and 47 and the one panel attaching portion 48 disposed between the base attaching portions 46 and 47. The standing portion 49 bends around the panel attaching portion 48 at the center and inflates into the inverted V-shape.

The airbag 40 is contained in a folded state, between the base section 2 and the knee protective panel 10 so as to surround the void 11 of the knee protective panel 10 (See FIG. 2). The airbag 40 is disposed along the periphery of the steering column 87 below the steering column 87. That is, the airbag 40 is disposed surrounding a part of the steering shaft 84 of the vehicle 80 from below. The base attaching portions 46 and 47 are attached to the base section 2 on the both sides of the steering shaft 84. The base attaching portions 46 and 47 are attached at positions separated by a distance in the vertical direction of the base section 2. When the airbag 40 is inflated and deployed, the standing portion 49 stands up from the base section 2 as a result of the inflation and protrudes toward the knee protective panel 10. The standing portion 49 stands up on the both sides of the steering shaft 84. The standing portion 49 moves the knee protective panel 10 and also supports the knee protective panel 10.

In this airbag 40, since the both side portions of the knee protective panel 10 can be supported in front of the driver's seat 81, stability of the knee protective panel 10 is improved. Furthermore, since inclination of the knee protective panel 10 can be suppressed when the knee part 92 is received by the knee protective panel 10, the knee part 92 of the occupant 90 can be protected more safely.

It should be noted that the present invention is not limited to the knee airbag device 1 but can be applied to other airbag devices. That is, an airbag similar to the above may be provided between the base section and the protective panel of various types of airbag devices. For example, in an airbag device for side collision of the vehicle 80, the airbag device is disposed in a base section of the vehicle 80 provided in a door. The base section is covered by a door trim that is a protective panel for the occupant 90. The airbag inflates and deploys between the base section and the door trim. The standing portions of the airbag stand up and move the door trim toward the occupant 90. The airbag device protects the occupant 90 in contact with the door trim. At the time of inflation and deployment of the airbag, the entire door trim may be moved toward the occupant 90. Alternatively, a part of the door trim may be moved toward the occupant 90. In this case, a part of the door trim functions both as a door trim and a protective panel. The protective panel is connected to the door trim and constitutes the part of the door trim. At the time of inflation and deployment of the airbag, only the protective panel moves toward the occupant 90.

In the airbag device for a pedestrian, the airbag device is disposed in the base section of the vehicle 80 provided in a bonnet. The base section is covered by the bonnet that is the protective panel for a pedestrian. The airbag inflates and deploys between the base section and the bonnet. The standing portions of the airbag stand up and move the bonnet. The bonnet is lifted up by the standing portions of the airbag. The airbag device protects a pedestrian in contact with the bonnet.

As described above, the present invention can be applied to various types of airbag devices which move the protective panel by the airbag. In each of the various types of the airbag devices, the capacity of the airbag can be made small and the airbag can be inflated and deployed in a short time. Moreover, by means of the airbag, the protective panel can be moved rapidly. An effect similar to the above-described effects can be also obtained. Note that the protective panel refers to a panel which is moved by the airbag and is for protecting a person (the occupant 90 or a pedestrian, for example).

DESCRIPTION OF THE REFERENCE SYMBOLS

1 Knee airbag device
2 Base section
3 Inflator
4 Fixing member
5 Space
10 Knee protective panel
11 Void
20 Airbag
21 Front-side base cloth
22 Back-side base cloth
23 Gas chamber
24 Outer edge joint portion
25 Opening portion
26, 27 Base attaching portion
28 Panel attaching portion
30 Standing portion
31 Inclined portion
35 Non-standing portion
40 Airbag
41 Front-side base cloth
42 Back-side base cloth
43 Outer edge joint portion
44 gas chamber
45 Opening portion
46, 47 Base attaching portion
48 Panel attaching portion
49 Standing portion
80 Vehicle
81 Driver's seat
82 Seatbelt
83 Steering wheel
84 Steering shaft
85 Instrument panel
86 Front windshield
87 Steering column
90 Occupant
91 Shank part
92 Knee part

The invention claimed is:

1. An airbag device disposed on a base section of a vehicle, comprising:
   a protective panel which covers the base section;
   an airbag which has a front-side base cloth disposed on the front side and a back-side base cloth disposed on the back side is formed into a rectangular shape by joining overlapped base cloths, and is inflated and deployed between the base section and the protective panel and moves the protective panel; and
   an inflator which inflates and deploys the airbag by generating a gas,
   wherein the airbag has at least two standing portions, each of which stands up from the base section through inflation and moves the protective panel,
   wherein each of the standing portions of the airbag has two base attaching portions attaching the back-side base cloth to the base section and one panel attaching portion disposed between the base attaching portions and attaching the front-side base cloth to the protective panel, and
   wherein the airbag is folded at the peripheral portions of the panel attaching portion.

* * * * *